United States Patent
Keller et al.

(10) Patent No.: US 7,579,430 B2
(45) Date of Patent: Aug. 25, 2009

(54) POLYMERIC MATERIAL MADE FROM SILOXANE-ACETYLENE POLYMER CONTAINING METAL-ACETYLENE COMPLEX

(75) Inventors: Teddy M. Keller, Fairfax Station, VA (US); Manoj Kolel-Veetil, Akexandria, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 194 days.

(21) Appl. No.: 11/239,452

(22) Filed: Sep. 27, 2005

(65) Prior Publication Data

US 2007/0073036 A1 Mar. 29, 2007

(51) Int. Cl.
*C08G 77/398* (2006.01)
*C08G 79/00* (2006.01)
*C08G 79/08* (2006.01)

(52) U.S. Cl. .......................... 528/394; 528/395; 528/25
(58) Field of Classification Search ................. 528/394, 528/395
See application file for complete search history.

(56) References Cited

U.S. PATENT DOCUMENTS

| | | | |
|---|---|---|---|
| 4,835,230 A * | 5/1989 | Khasat et al. ............... 526/221 |
| 4,906,710 A * | 3/1990 | Burns et al. ................. 525/474 |
| 5,272,237 A | 12/1993 | Keller et al. |
| 5,292,779 A | 3/1994 | Keller et al. |
| 5,348,917 A | 9/1994 | Keller et al. |
| 5,483,017 A | 1/1996 | Keller et al. |
| 5,552,505 A | 9/1996 | Keller |
| 5,563,181 A | 10/1996 | Keller et al. |
| 5,635,250 A * | 6/1997 | Blum et al. ................. 427/387 |
| 5,679,818 A | 10/1997 | Bucca et al. |
| 5,681,870 A | 10/1997 | Keller et al. |
| 5,756,629 A | 5/1998 | Keller et al. |
| 5,780,569 A | 7/1998 | Keller et al. |
| 5,807,953 A | 9/1998 | Bucca et al. |
| 5,844,052 A | 12/1998 | Keller et al. |
| 5,874,514 A | 2/1999 | Keller et al. |
| 5,932,335 A | 8/1999 | Keller et al. |
| 5,958,324 A * | 9/1999 | Bujalski et al. ............. 264/470 |
| 5,969,072 A | 10/1999 | Keller et al. |
| 5,981,678 A | 11/1999 | Keller et al. |
| 5,986,032 A | 11/1999 | Keller et al. |

(Continued)

OTHER PUBLICATIONS

Haussler et al. J. Phys. Chem. B 108, 10645-10650 and Supporting Information.*

(Continued)

*Primary Examiner*—Randy Gulakowski
*Assistant Examiner*—Robert Loewe
(74) *Attorney, Agent, or Firm*—John J. Karasek; Joseph T. Grunkemeyer (57) ABSTRACT

A metallized polymer having a backbone having an acetylenic repeat unit and $-SiR_2-(O-SiR_2)_n-$ and/or $-SiR_2-(O-SiR_2)_n-[Cb-SiR_2-(O-SiR_2)_n]_m-$. At least one of the acetylenic repeat units contains a $(ML_x)_y$-acetylene complex. M is a metal, L is a ligand, x and y are positive integers, R is an organic group, Cb is a carborane, and n and m are greater than or equal to zero. A composition containing a siloxane polymer and a metallic compound. The siloxane polymer has a backbone having one or more acetylene groups and $-SiR_2-(O-SiR_2)_n-$ and/or $-SiR_2-(O-SiR_2)_n-[Cb-SiR_2-(O-SiR_2)_n]_m-$. The metallic compound is capable of reacting with the acetylene group to form a $(ML_x)_y$-acetylene complex.

25 Claims, 1 Drawing Sheet

U.S. PATENT DOCUMENTS

| | | | |
|---|---|---|---|
| 6,025,453 | A | 2/2000 | Keller et al. |
| 6,103,178 | A * | 8/2000 | Bujalski et al. ............. 264/470 |
| 6,187,703 | B1 | 2/2001 | Keller et al. |
| 6,225,247 | B1 | 5/2001 | Keller et al. |
| 6,265,336 | B1 | 7/2001 | Keller et al. |
| 6,362,289 | B1 | 3/2002 | Keller et al. |
| 6,495,483 | B1 | 12/2002 | Keller et al. |
| 6,579,955 | B2 | 6/2003 | Keller et al. |
| 6,759,502 | B1 * | 7/2004 | Tang et al. ..................... 528/9 |
| 6,767,981 | B1 | 7/2004 | Keller et al. |
| 6,770,583 | B2 | 8/2004 | Keller |
| 6,784,259 | B2 | 8/2004 | Keller et al. |
| 6,784,270 | B1 | 8/2004 | Keller et al. |
| 6,787,615 | B2 | 9/2004 | Keller et al. |
| 6,846,345 | B1 * | 1/2005 | Keller et al. .................. 75/255 |
| 2003/0108477 | A1 * | 6/2003 | Keller et al. ............. 423/447.1 |
| 2005/0148750 | A1 | 7/2005 | Keller |
| 2005/0171316 | A1 | 8/2005 | Keller et al. |
| 2005/0171317 | A1 | 8/2005 | Keller et al. |
| 2006/0199928 | A1 * | 9/2006 | Tang et al. .................. 526/285 |

OTHER PUBLICATIONS

Berenbaum et al. Adv. Mater. 2003, 15, 51-55.*

Hamilton et al. Chem. Commun. 1998, 1749-1750.*

Corriu et al., Journal of Organometallic Chemistry, 1996, 509, 246-257.*

Corriu et al., "Organosilicon Polymers: Pyrolysis Chemistry of Poly[(dimethylsilylene)diacetylene]," *Organometallics*, 11(7), 2507 (1992).

Corriu et al., "Pyrolysis of poly[(silylene) diacetylenes]: direct evidence between their morphology and thermal behavior," *J. Organomet. Chem.*, 449(1-2), 111 (1993).

Henderson et al., "Synthesis and Characterization of Poly(carborane-siloxane-acetylene)," *Macromolecules*, 27(6), 1660 (1994).

Hor et al., "Substituted Metal-Carbonyls Part. XVII. Thermal Decarbonylation and Chelation of $M(CO)_5(\eta$-dppf$)$ and $Fe(CO)_4(\eta$-dppf$)$ [where M=Cr, Mo, W; dppf=$(Ph_2PC_5H_4)_2Fe$]," *Thermochimica Acta*, 178, 287 (1991).

Houser et al., "Linear Ferrocenylene-Siloxyl-Diacetylene Polymers and Their Conversion to Ceramics with High Thermal and Oxidative Stabilities," *Macromolecules*, 31(12), 4038 (1998).

Klinger et al., "Synthesis, reactivity, and molecular structure of cyclopentadienylmolybdenum dicarbonyl dimer. Molybdenum-molybdenum triple bond," *J. Am. Chem. Soc.*, 97(12), 3535 (1975).

Lindsell et al., "Synthesis and characterization of cobalt and molybdenum complexes derived from linear conjugated diynenes, triynedienes and tetraynetrienes," *J. Organomet. Chem.*, 439(2), 201 (1992).

Masuda et al., "Polymerization of phenylacetylene induced by UV. Irradiation of group 6 transition metal carbonyls," *Polymer*, 23(11), 1663 (1982).

* cited by examiner

POLYMERIC MATERIAL MADE FROM SILOXANE-ACETYLENE POLYMER CONTAINING METAL-ACETYLENE COMPLEX

U.S. Nonprovisional Patent Application Nos. 11/239,448 and 11/239,454 are incorporated by reference.

BACKGROUND OF THE INVENTION

1. Field of the Invention

The invention generally relates to polymeric materials.

2. Description of Related Art

Most transition metal-based polymers reported to date do not contain units for conversion to a thermoset and thus afford low char yields at elevated temperatures. Carboranylenesiloxanes are highly sought after high temperature, thermally and thermo-oxidatively stable polymers (Dvornic et al., *High temperature Siloxane Elastomers*; Huthig & Wepf: Heidelberg, Germany (1990)). These materials are desirable, especially when it comes to their thermo-oxidative stabilities at very high temperatures. The introduction of unsaturated cross-linkable units such as a diacetylene unit in such materials resulted in the production of extended polymer networks of carboranylenesiloxanes (Henderson et al., "Synthesis and Characterization of Poly(carborane-siloxane-acetylene)," *Macromolecules*, 27(6), 1660 (1994)).

SUMMARY OF THE INVENTION

The invention comprises a metallized polymer comprising a backbone comprising an acetylenic repeat unit and one or more repeat units selected from —SiR$_2$—(O—SiR$_2$)$_n$— and —SiR$_2$—(O—SiR$_2$)$_n$-[Cb-SiR$_2$—(O—SiR$_2$)$_n$]$_m$—. At least one of the acetylenic repeat units comprises a (ML$_x$)$_y$-acetylene complex. Each M is an independently selected metal, each L is an independently selected ligand, each x and each y is a positive integer, each R is an independently selected organic group, each Cb is an independently selected carborane, and each n and each m is an independently selected integer greater than or equal to zero.

The invention further comprises a composition comprising a siloxane polymer and a metallic compound. The siloxane polymer comprises a backbone comprising one or more acetylene groups, and one or more repeat units selected from —SiR$_2$—(O—SiR$_2$)$_n$— and —SiR$_2$—(O—SiR$_2$)$_n$-[Cb-SiR$_2$—(O—SiR$_2$)$_n$]$_m$—. The metallic compound is capable of reacting with the acetylene group to form a (ML$_x$)$_y$-acetylene complex. M, L, x, y, R, Cb, n, and m are as defined above.

BRIEF DESCRIPTION OF THE DRAWINGS

A more complete appreciation of the invention will be readily obtained by reference to the following Description of the Example Embodiments and the accompanying drawings.

FIG. 1 shows IR spectra demonstrating the formation of a metal-acetylene complex.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The incorporation of transition metals into a polymer structure may be used to prepare materials with different properties from conventional carbon-based polymers. In general, the rich diversity of coordination numbers and geometries available for transition elements offer the possibility of accessing polymers with unusual conformational, mechanical, and morphological characteristics.

Metal species may be incorporated in the polymer backbone of diacetylene-containing carboranylenesiloxanes (Houser et al., "Linear Ferrocenylene-Siloxyl-Diacetylene Polymers and Their Conversion to Ceramics with High Thermal and Oxidative Stabilities," *Macromolecules*, 31(12), 4038 (1998); Keller et al., U.S. Pat. No. 5,844,052). The constituent diacetylene unit, in addition to forming extended networks upon crosslinking, can function as a vehicle for metal incorporation prior to cross-linking as it can form adducts with various metal species. For example, alkynes in general can add across the metal-metal triple bond in Cp$_2$Mo$_2$(CO)$_6$ to form adducts of the type Cp$_2$Mo$_2$(CO)$_6$(μ-η$^2$:η$^2$-R—C≡C—R) with a tetrahedral C$_2$Mo$_2$ core (Eq. (1)) (Klinger et al., "Synthesis, reactivity, and molecular structure of cyclopentadienylmolybdenum dicarbonyl dimer. Molybdenum-molybdenum triple bond," *J. Am. Chem. Soc.*, 97(12), 3535 (1975)). In fact, under photochemical conditions, some metal complexes are even known to function as catalysts for the crosslinking of acetylenes (Masuda et al., "Polymerization of phenylacetylene induced by UV. Irradiation of group 6 transition metal carbonyls," *Polymer*, 23(11), 1663 (1982)).

(1)

The metallized polymer may be made by heating a composition of a siloxane polymer and a metallic compound. This method may also produce a composition comprising siloxane thermoset and metallic compound and/or a composition comprising siloxane thermoset and one or more metallic components dispersed homogeneously throughout the composition, the metallic component selected from free metal atoms, metal clusters, metal nanoparticles, organometallic compounds, organometallic units, and metal salts. Organometallic compounds and metal salts may be, but are not limited to, reactants used to form the metallized polymer/thermoset, either unreacted or previously reacted and released during the heating. Organometallic units may be, but are not limited to, metallic repeat units in the backbone that have decomposed from the backbone. The metallic component may be generated while heating. As used herein, the term "siloxane" also includes silanes, as when n is zero. The backbone may also comprise one or more metallic repeat units selected from metallocenylene, -M'Cp$_2$-, and -M'L'$_z$-. Each M' is a metal, Cp is cyclopentadienyl, each L' is an independently selected ligand, and each z is an integer from 2 to 6. Such metallic repeat units are shown in Eq. (2).

(2)

Such siloxane polymers and methods of making them are disclosed in U.S. Pat. Nos. 5,272,237; 5,292,779; 5,348,917; 5,483,017; 5,552,505; 5,563,181; 5,679,818; 5,681,870; 5,756,629; 5,780,569; 5,807,953; 5,844,052; 5,874,514; 5,932,335; 5,969,072; 5,981,678; 5,986,032; 6,025,453; 6,187,703; 6,225,247; 6,265,336; 6,362,289; 6,495,483; 6,579,955; 6,767,981; 6,770,583; 6,784,259; 6,784,270; 6,787,615 to Keller et al. and U.S. Patent Application Publication Nos. 2005/0148750, 2005/0171316, and 2005/0171317 to Keller et al. Generally, such polymers may be made, among other methods, by reacting halogen-terminated units with hydroxyl-terminated units or metal-terminated units, including lithium-terminated units.

THF may be used as a solvent for the reaction to facilitate the displacement of, for example, the carbonyl ligands. In most solvents, the predominant isomer is trans. In solvents such as DMSO, THF, DMF, hexanes, or mixtures of them, the ratio can be reversed. Between the trans and gauche isomers, the carbonyl exchange or displacement with the lowest energy dynamics is observed in gauche-$Cp_2Mo_2(CO)_6$.

The acetylenic repeat unit comprises one or more acetylene groups, any of which may be $(ML_x)_y$-acetylene complex. In some embodiments, the acetylenic repeat unit is based on diacetylene. Such a repeat unit consists of two groups independently selected from acetylene and $(ML_x)_y$-acetylene complex.

Suitable metals for the M in the complex or metallic compound include, but are not limited to, main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

Suitable ligands (L group) for the complex or metallic compound include, but are not limited to, carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

Suitable Cb groups include, but are not limited to, —$CB_{10}H_{10}C$— (dodecacarborane). Suitable R groups include, but are not limited to, methyl. All the R groups may be methyl.

Suitable values for x include, but are not limited to, 1 to 16 or 1 to 12. Suitable values for y include, but are not limited to, 1 to 6 or 1 to 4. Suitable metallic compounds (including metal salts) include, but are not limited to, $V(CO)_6$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Fe_2(CO)_9$, $Fe_3(CO)_{12}$, $Ru(CO)_5$, $Ru_3(CO)_{12}$, $OS(CO)_5$, $Os_3(CO)_{12}$, $Co_2(CO)_8$, $Co_3(CO)_{12}$, $Co_6(CO)_{16}$, $Rh_4(CO)_{12}$, $Rh_6(CO)_{16}$, $Ir_4(CO)_{12}$, $Ir_6(CO)_{16}$, $Ni(CO)_4$, $Cp(CH_3)Re(CO)_3$, $Cp(CH_3)_5Re(CO)_3$, $[Cp(CH_3)_5]_2Cr_2(CO)_4$, $Cp_2Fe_2(CO)_4$, $C_6H_8Fe(CO)_3$, $C_8H_8Fe(CO)_3$, $CpCr(CO)_3$, $Cp_2Mo_2(CO)_6$, $C_7H_8Mo(CO)_3$, $CpMn(CO)_3$, $Cp(Si(CH_3)_3)Mn(CO)_3$, $Cp(CH_3)_5Rh(CO)_2$, $Cp_2Ru_2(CO)_4$, (hexafluoroacetylacetonate)Cu(cyclooctadiene), Cr(hexafluroacetylacetonate), Co(acetylacetonate) $(CH_3CN)_4Cu$(hexafluroacetylacetonate), $(CH_3)_2Au$(acetylacetonate), (cyclooctadiene)Ir(acetylacetonate), Fe(acetylacetonate), Mn(acetylacetonate), $MoO_2$(acetylacetonate)$_2$, Ni(hexafluroacetylacetonate), Ni(cyclooctadiene)$_2$, $Ni(SCN)_2$, $PdCl_2(CH_3CN)_2$, $Pd(H_3)_2(NO_2)_2$, $Pt(NH_3)_2Cl_2$, $Rh$(cyclooctadiene)$_2(SO_3CF_3)$, $Rh$(cyclooctadiene)$Cl_2$, Zr(trifluoroacetylacetonate), $MgCl_2$, $SmCl_2$, and $AlCl_2$.

Suitable metallocenylenes in the metallic repeat unit include, but are not limited to, ferrocenylene. Suitable M' groups include, but are not limited to, main group metals, transition metals, lanthanides, actinides, iron, ruthenium, osmium, molybdenum, zirconium, vanadium, tungsten, titanium, platinum, nickel, rhodium, and palladium. Suitable M' groups for metallocenylene include, but are not limited to, iron, ruthenium, osmium, molybdenum. Suitable M' groups for -M'Cp$_2$- include, but are not limited to, molybdenum, zirconium, vanadium, and tungsten. Suitable M' groups for -M'L'$_z$-, include, but are not limited to, platinum, nickel, rhodium, palladium, and ruthenium. Suitable L' groups include, but are not limited to, amino, ethylene, and cyclooctadiene.

In some embodiments, the metallic polymer has the structure shown in Eq. (3). Q is the acetylenic repeat unit. Y is the metallic repeat unit. Each p is an integer greater than or equal to zero. Suitable combinations of n, m, and p include, but are not limited to, n is 1, m is 1, and p is zero (Eq. (4)); n is 1, m is zero, and p is zero (Eq. (5)); n is 1, m is 1, and p is 1 (Eq. (6)); and n is 1, m is zero, and p is 1 (Eq. (7)).

(3)

(4)

(5)

(6)

(7)

A composition may be made comprising the metallized polymer and siloxane polymer. This may be made when not all molecules contain a $(ML_x)_y$-acetylene complex, such as when an excess of polymer is present.

Another composition comprises siloxane polymer without any metallized polymer. This composition may also comprise a metallic compound capable of reacting with the acetylenic repeat unit to form a $(ML_x)_y$-acetylene complex. This allows for the formation of $(ML_x)_y$-acetylene complex, though such formation is not required. Such a compound may also be in the composition when metallized polymer is present.

The reaction of a siloxane polymer with a metal carbonyl or a neutral metal complex with labile ligands can be carried out at various ratios of the siloxane and metallic compound. The ratio can be chosen so as to retain a desired fraction of the starting inorganic-organic hybrid polymer in its unreacted and partially reacted forms in the product mixture (Eq. (8)). Such a retention is achieved to provide unreacted and partially reacted diacetylene units in the product mixture for utilization in thermoset formation by their crosslinking reactions. The reactant ratios at least partly dictate the ratio of the product components.

(8)

Figure 1A:
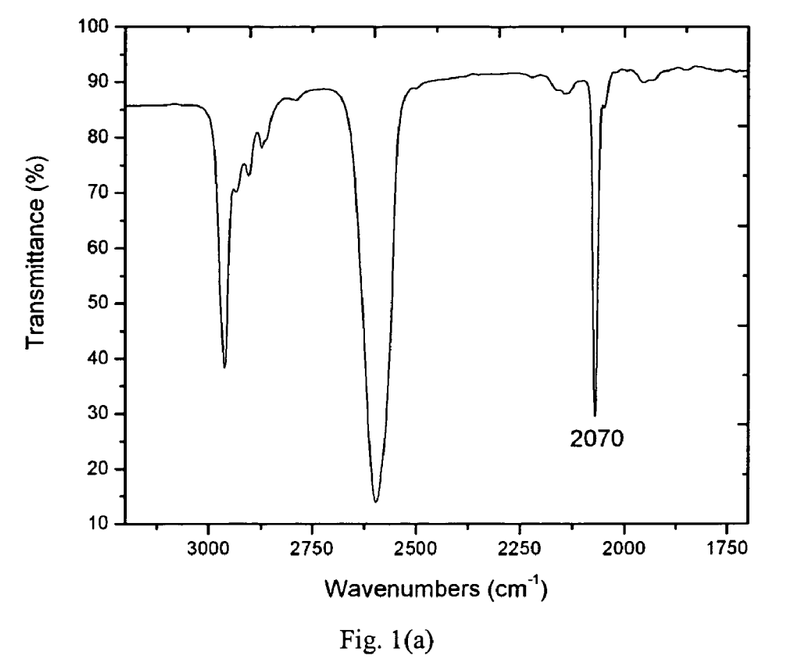
Figure 1B:
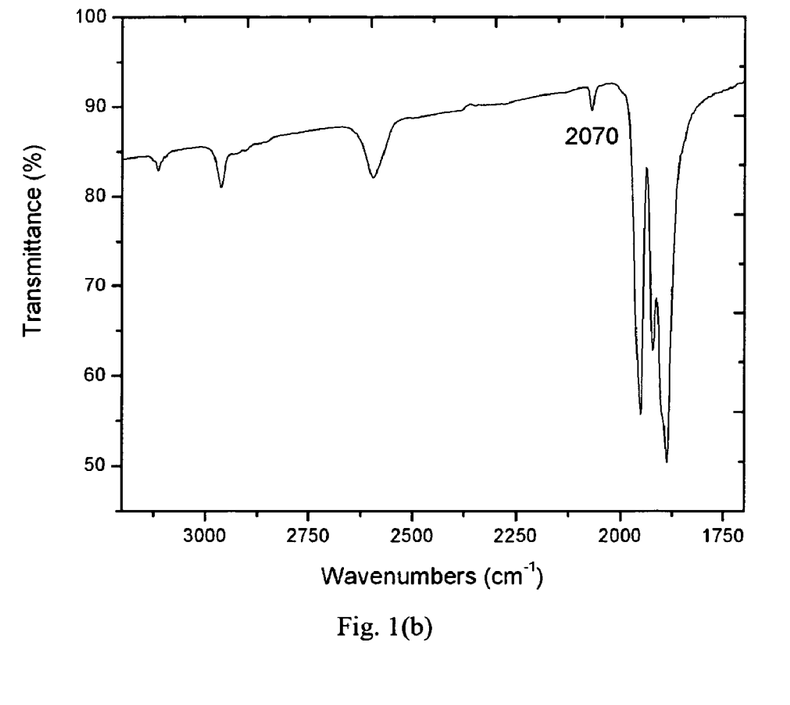

As used herein, a molar ratio of polymer to metal compound refers to the ratio of the acetylenic repeat unit (such as a diacetylene repeat unit) to metal compound. In a reaction using the siloxane polymer shown in Eq. (4) (1) performed at an equimolar ratio of acetylenic repeat units and $Cp_2Mo_2(CO)_6$, three products of the form in Eq. (8) can be formed in various amounts depending on the reaction kinetics. The evidence of the reaction and its progress may be provided by FTIR spectroscopy. The equimolar reaction of $Cp_2Mo_2(CO)_6$ with 1 in refluxing THF results in the displacement of two of the carbonyl ligands by the diacetylene, yielding the transient, reactive triply-bonded $Cp_2Mo_2(CO)_6$ and subsequently, a π-bonded complex. As the reaction progresses, the initial IR absorptions of $Cp_2Mo_2(CO)_6$ (1960 and 1915 cm$^{-1}$) (FIG. 1(a)) are replaced by new IR absorptions at 1950, 1923, 1900 and 1891 cm$^{-1}$ of the diacetylene-bound $Cp_2Mo_2(CO)_6$ moieties (FIG. 1(b)). The presence of an unchanged diacetylene absorption at 2070 cm$^{-1}$ in the FTIR spectrum of the final product suggests that a fraction of the starting material remains unreacted as expected. Since the reaction is quantitative in yield, this implies that the starting reactant $Cp_2Mo_2(CO)_6$ has to be distributed among the reacted fraction of the siloxane polymer yielding either a mono or a bis π-coordinated $\eta^5$-cyclopentadienyltetracarbonyl-dimolybdenum complex. Such a formation of π-complexes has been reported in the reaction involving $Cp_2Mo_2(CO)_6$ and the conjugated enediyne, E-1,6-bis(trimethylsilyl)hexa-1,5-diyn-3-ene (Lindsell et al., "Synthesis and characterization of cobalt and molybdenum complexes derived from linear conjugated diynenes, triynedienes and tetraynetrienes," J. Organomet. Chem., 439(2), 201 (1992). Further evidence for the retention of a fraction of the siloxane polymer in its unreacted form is obtained from the product's $^{13}$C NMR spectrum in CDCl$_3$. In the $^{13}$C NMR spectrum, the NMR resonances of the diacetylene carbons (C1 and C2 in Eq (9)) of the siloxane at δ 87.05 and 84.81 are still evident indicating the presence of some unreacted siloxane polymer. In addition, the resonances for the carbons of the diacetylene units in the mono- and bis-$Cp_2Mo_2(CO)_6$ derivatives are observed at δ 132.46 (C4), 130.86 (C8), 128.79(C5), 111.22 (C3), and 92.29 (C6 and C7). Unique resonances are also observed for the cyclopentadienyl groups (δ 95.72 (PR); δ 91.99 (CR)) and the carbonyl ligands (δ 241.5 (PR), 234.1 (PR), 229.8 (PR); 226.5 (CR), 223.9 (CR)) of the π-coordinated mono- and bis-$Cp_2Mo_2(CO)_6$ complexes. The observed $^{13}$C resonances are well in agreement with similar reported values for the π-coordinated mono- and bis-$Cp_2Mo_2(CO)_6$ complexes formed from the reaction between $Cp_2Mo_2(CO)_6$ and the conjugated enediyne, E-1,6-bis(trimethylsilyl)hexa-1,5-diyn-3-ene (Lindsell, Id.). Together, the FTIR and FTNMR spectroscopic studies of the reaction product confirmed that free diacetylene units and acetylene fragments are available in the product for its conversion into a network system by thermal crosslinking.

(9)

Similar reactions of 1, 2, 3, or 4 at desired ratios (for example, 3:1, 1:5, etc.) with a particular metal carbonyl or a labile ligand-containing neutral metal complex can yield differing amounts of the unreacted, partially reacted and completely reacted polymers of 1, 2, 3, or 4.

Having described the invention, the following examples are given to illustrate specific applications of the invention. These specific examples are not intended to limit the scope of the invention described in this application.

Instrumentation—Thermogravimetric analyses (TGA) were performed on a SDT 2960 DTA-TGA analyzer under a nitrogen flow rate of 100 cc/min. The heating rate was 1° C./min, 2° C./min, or 10° C./min and the cooling rate was 5° C./min. The differential scanning calorimetry (DSC) studies were performed on a DSC 2920 modulated DSC instrument and carried out with heating rates of 10° C./min and a nitrogen flow rate of 100 cc/min. Infrared (IR) spectra were obtained on a Nicolet Magna 750 Fourier transform infrared spectrometer. Solution-state $^{13}$C NMR spectra were acquired on a Bruker AC-300 spectrometer and referenced to the internal solvent peak (chloroform-d, or $CDCl_3$).

EXAMPLE 1

Synthesis of poly(carborane-siloxane-diacetylene), 1—The reaction was initiated in two flasks, the contents of which were later mixed to yield the product.

Flask #1: THF (3.5 mL) and n-butyllithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h.

Flask #2: A flame-dried 200 mL flask under argon was charged with 0.285 g of m-carborane (1.974 mmol). THF (1 mL) was transferred to this flask and m-carborane was dissolved in it. The reaction flask was immersed in an ice bath and 1.99 mL of a 2.0 M lithium diisopropyamide solution in THF (3.98 mmol) was added drop wise via syringe. After the addition was complete, the mixture was warmed to room temperature and stirred for 2 h. The volatiles were then removed with high vacuum and the solid residue was redissolved in THF (5 mL). The solution was then cooled with an ice bath and 0.77 mL of 1,3-dichlorotetramethyldisiloxane (3.949 mmol) was added drop wise. The ice bath was removed and the reaction was allowed to proceed for another 5 h.

The contents of flask #2 were cooled in an ice bath. The contents of flask #1 were then cannulated into flask #2. The reaction was allowed to proceed overnight. After this period, a few extra drops of the siloxane reagent were added to the mixture and the reaction was continued for two more hours. The mixture was then poured into an aqueous saturated $NH_4Cl$ solution (30 mL). The aqueous mixture was extracted with $Et_2O$ (3×20 mL). The ether extracts were then combined, dried over $Na_2SO_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 2

Synthesis of poly(siloxane-diacetylene), 2—THF (3.5 mL) and n-butyllithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h. After this period, the reaction flask was cooled again to −78° C. and 0.39 mL of 1,3-dichlorotetramethyldisiloxane (1.975 mmol) was added drop wise. The ice bath was removed and the reaction was allowed to proceed overnight. After this period, a few extra drops of the siloxane reagent were added to the mixture and the reaction was continued for two more hours. The mixture was then poured into an aqueous saturated $NH_4Cl$ solution (30 mL). The aqueous mixture was extracted with $Et_2O$ (3×20 mL). The ether extracts were then combined, dried over $Na_2SO_4$ and the dried extracts were filtered through celite. The filtered extracts were subjected to vacuum to remove the ether, which resulted in-an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 3

Synthesis of poly(carborane-siloxane-diacetylene-siloxane-ferrocene), 3—The reaction was initiated in two flasks, the contents of which were later mixed to yield the product.

Flask 1: Synthesis of Li$_2$Cp$_2$Fe.TMEDA: A Schlenk flask, flame-dried under vacuum, was charged with 1.27 g (6.83 mmol) of ferrocene and 40 mL of hexane under argon. The resulting orange slurry was stirred at room temperature for 1 h. The solution was then treated with 2.07 mL or 1.59 g (13.66 mmol) of TMEDA via syringe. The mixture was cooled to −78° C. in a dry ice/isopropanol bath. 5.44 mL of a 2.5 M n-BuLi solution in hexanes was then added to the mixture and the solution was stirred for 18 h. An orange precipitate had formed at the end of the reaction. The precipitate was collected by filtering the mixture through a fritted funnel that was attached to another flame dried Schlenk flask by connecting the flask to the free end of the funnel followed by inversion of the flask. The precipitate was dissolved in 10 mL of THF for addition to contents of Flask 2.

Flask 2: Synthesis of (Cl-disiloxyl-carboranyl-disiloxyl-diacetylene-disiloxyl-carboranyl-disiloxyl-Cl): THF (10 mL) and n-butyllithium (10.2 mL, 2.50 M, 25.50 mmol) were transferred to a flame-dried 50 mL flask and the mixture was cooled to −78° C. in a dry ice/2-propanol bath. While stirring, 1.10 mL of hexachlorobutadiene (6.830 mmol) was added drop wise over 15 min. After the addition, the reaction mixture was warmed to room temperature and stirred for 3 h. After this period, the mixture was cooled to −78° C. and a preformed solution of Cl-disiloxyl-carboranyl-disiloxyl-Cl (13.660 mmol) was added dropwise to it. The mixture was then stirred at room temperature for 3 h.

The mixture was again cooled to −78° C. and the THF solution of the lithiated ferrocenyl compound from Flask 1 was cannulated into it. The mixture was stirred at room temperature for 2 h, a few drops of the siloxane reagent were added, and the stirring was continued for an hour more. The mixture was then subjected to an aqueous work-up to yield the product. (1.9 g, 100%). IR (KBr, cm$^{-1}$): 3092 (Fc), 2961 ($v_{C-H}$ Si—CH$_3$), 2921 ($v_{C-H}$ Si—CH$_3$), 2599 ($v_{B-H}$), 2075 ($v_{C-C}$), 1414 ($v_{CH2\ bend}$), 1261 ($v_{Si-C}$), 1077 ($v_{Si-O}$), 797 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C≡C), and 84.2 (—C≡C).

EXAMPLE 4

Synthesis of poly( ferrocene-siloxane-diacetylene), 4—THF (10 mL) and n-butyllithium (10.2 mL, 2.50 M, 25.50 mmol) were transferred to a flame-dried 50 mL flask and the mixture was cooled to −78° C. in a dry ice/2-propanol bath. While stirring, 1.10 mL of hexachlorobutadiene (6.830 mmol) was added drop wise over 15 min. After the addition, the reaction mixture was warmed to room temperature and stirred for 3 h. After this period, the mixture was cooled to −78° C. and 2.66 mL of the dichlorotetramethyldisiloxane reagent (13.660 mmol) was added dropwise to it. The mixture was then stirred at room temperature for 3 h. The mixture was again cooled to −78° C. and a 10 mL THF solution, prepared in a separate flask, of 2.9 g of the lithiated ferrocenyl compound (6.830 mmol) was cannulated into the mixture. The mixture was stirred at room temperature for 2 h, a few drops of siloxane reagent were added, and the stirring was continued for an hour more. The mixture was then subjected to an aqueous work-up to yield the product. (1.9 g, 100%). IR (KBr, cm$^{-1}$): 3092 (Fc), 2961 ($v_{C-H}$ Si—CH$_3$), 2921 ($v_{C-H}$ Si—CH$_3$), 2599 ($v_{B-H}$), 2075 ($v_{C-C}$), 1414 ($v_{CH2\ bend}$), 1261 ($v_{Si-C}$), 1077 ($v_{Si-O}$), 797 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C≡C), and 84.2 (—C≡C).

EXAMPLE 5

Reaction of Co$_2$(CO)$_8$ with 1 at a ratio of Co:1=1:1—Reagents 1 (0.5 g, 1.099 mmol) and Co$_2$(CO)$_8$ (0.365 g, 1.099 mmol) were taken in separate flame dried Schlenk flasks under argon. The reagents were dissolved in the non-polar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. It was allowed to proceed until the disappearance of the carbonyl absorptions of Co$_2$(CO)$_8$ (absorptions for Co$_2$(CO)$_8$ are 2022, 1847, and 1828 cm$^{-1}$) was achieved. (In this case, the completion of the reaction was indicated by three new carbonyl absorptions at 2097, 2062, and 2030 cm$^{-1}$ and a remnant diacetylene absorption at 2070 cm$^{-1}$ in the product's IR). The product (yield=99.5%) was collected by removing hexane under vacuum with the flask placed in an oil bath at 80° C. Yield=99.9%.

EXAMPLE 6

Reaction of Co$_2$(CO)$_8$ with 1 at a ratio of Co:1=1:5—A Schlenk flask, flame-dried under vacuum, was charged with 0.073 g (0.220 mmol) of Co$_2$(CO)$_8$ and 15 mL of hexane was syringed into it under argon to produce a solution of the Co reactant. The solution was cooled to −78° C. in dry ice/isopropanol bath. In another flame-dried Schlenk flask 0.5 g (1.099 mmol) of 1 was dissolved in 35 mL of hexane and the solution was cannulated into the former flask via cannula. After the addition, the solution was allowed to warm to room temperature when a reddish brown solution resulted. An IR spectrum of the aliquot was obtained after 30 min of stirring. The spectrum exhibited no carbonyl absorptions of Co$_2$(CO)$_8$. Instead there were new carbonyl absorptions at 2097, 2062, and 2030 cm$^{-1}$ that had resulted from the species derived from Co$_2$(CO)$_8$ on reaction with 1. (In this case, the completion of the reaction is indicated by three new carbonyl absorptions at 2097, 2062, and 2030 cm$^{-1}$ and a remnant diacetylene absorption at 2070 cm$^{-1}$ in the product's IR. The intensity of the diacetylene absorption is 2-3 times more than that in the Co:1=1:1 reaction). The reaction was stopped at this point and the solvents were removed under vacuum with the flask placed in an oil bath at 80° C. Yield=99.9%.

EXAMPLE 7

Reaction of Co$_2$(CO)$_8$ with 1 at a ratio of Co:1=3:1—A Schlenk flask, flame-dried under vacuum, was charged with 1.095 g (3.297 mmol) of Co$_2$(CO)$_8$ and 25 mL of hexane was syringed into it under argon to produce a solution of the Co reactant. The solution was cooled to −78° C. in dry ice/isopropanol bath. In another flame-dried Schlenk flask 0.5 g (1.099 mmol) of 1 was dissolved in 40 mL of hexane and the solution was cannulated into the former flask via cannula. After the addition, the solution was allowed to warm to room temperature when a reddish brown solution resulted. An IR spectrum of the aliquot was obtained after 30 min of stirring. The spectrum exhibited no carbonyl absorptions of Co$_2$(CO)$_8$. Instead there were new carbonyl absorptions at 2097, 2062, and 2030 cm$^{-1}$ that had resulted from the species derived from Co$_2$(CO)$_8$ on reaction with 1. (In this case, the completion of the reaction is indicated by three new carbonyl absorptions and remnant of Co$_2$(CO)$_8$ absorptions in the product's IR). The reaction was stopped at this point and the solvents were removed under vacuum with the flask placed in an oil bath at 80° C. Yield=99.9%.

EXAMPLE 8

Reaction of Co$_2$(CO)$_8$ with 2 at a ratio of Co:2=1:1—Reagents 2 (0.198 g, 1.099 mmol) and Co$_2$(CO)$_8$ (0.365 g, 1.099 mmol) were taken in separate flame dried Schlenk flasks under argon. The reagents were dissolved in the nonpolar solvent hexane and cooled to −78° C. in dry ice/isopropanol bath. Subsequently, the solution of 2 was transferred to the flask containing the Co reagent solution using a cannula. The observations during the monitoring of the reaction (by FTIR spectroscopy) and the workup of the product were as in Example 5. Yield=99.5%.

EXAMPLE 9

Reaction of $Co_2(CO)_8$ with 2 at a ratio of Co:2=1:5—A Schlenk flask, flame-dried under vacuum, was charged with 0.073 g (0.220 mmol) of $Co_2(CO)8$ and 15 mL of hexane was syringed into it under argon to produce a solution of the Co reactant. The solution was cooled to −78° C. in dry ice/isopropanol bath. In another flame-dried Schlenk flask 0.198 g (1.099 mmol) of 2 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 6. Yield=99.5%.

EXAMPLE 10

Reaction of $Co_2(CO)_8$ with 2 at a ratio of Co:2=3:1—A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.198 g (1.099 mmol) of 2 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 7. Yield=99.5%.

EXAMPLE 11

Reaction of $Co_2(CO)_8$ with 3 at a ratio of Co:3=1:1—Reagents 3 (0.842 g, 1.099 mmol) and $Co_2(CO)_8$ (0.365 g, 1.099 mmol) were taken in separate flame dried Schlenk flasks under argon. The reagents were dissolved in the nonpolar solvent hexane and cooled to −78° C. in dry ice/isopropanol bath. Subsequently, the solution of 3 was transferred to the flask containing the Co reagent solution using a cannula. After the addition, the solution was warmed to room temperature. The observations during the monitoring of the reaction (by FTIR spectroscopy) and the workup of the product were as in Example 5. Yield=99.5%.

EXAMPLE 12

Reaction of $Co_2(CO)_8$ with 3 at a ratio of Co:3=1:5—A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.842 g (1.099 mmol) of 3 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 6. Yield=99.5%.

EXAMPLE 13

Reaction of $Co_2(CO)_8$ with 3 at a ratio of Co:3=3:1—A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.842 g (1.099 mmol) of 3 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 7. Yield=99.5%.

EXAMPLE 14

Reaction of $Co_2(CO)_8$ with 4 at a ratio of Co:4=1:1—Reagents 4 (0.545 g, 1.099 mmol) and $Co_2(CO)_8$ (0.365 g, 1.099 mmol) were taken in separate flame dried Schlenk flasks under argon. The reagents were dissolved in the nonpolar solvent hexane and cooled to −78° C. in dry ice/isopropanol bath. Subsequently, the solution of 4 was transferred to the flask containing the Co reagent solution using a cannula. After the addition, the solution was warmed to room temperature. The observations during the monitoring of the reaction (by FTIR spectroscopy) and the workup of the product were as in Example 5. Yield=99.5%.

EXAMPLE 15

Reaction of $Co_2(CO)_8$ with 4 at a ratio of Co:4=1:5—A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.545 g (1.099 mmol) of 4 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 6. Yield=99.5%.

EXAMPLE 16

Reaction of $Co_2(CO)_8$ with 4 at a ratio of Co:4=3:1—A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.545 g (1.099 mmol) of 4 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 7. Yield=99.5%.

EXAMPLE 17

Reaction of $Cp_2Mo_2(CO)_6$ with 1 at a ratio of Mo:1=1:1—A Schlenk flask, flame-dried under vacuum, was charged with 0.25 g (0.5495 mmol) of 1 and 5 mL of THF, which was syringed into it under argon. In another flame-dried Schlenk flask $Cp_2Mo_2(CO)_6$ (0.269 g; 0.5495 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of $Cp_2Mo_2(CO)_6$ (absorptions for $Cp_2Mo_2(CO)_6$ are 1960 and 1915 $cm^{-1}$) was achieved. (In this case the completion of the reaction was indicated by four new carbonyl absorptions at 1950, 1923, 1900, and 1891 $cm^{-1}$ and a remnant diacetylene absorption at 2070 $cm^{-1}$ in the product's IR). The solvents were then removed under vacuum at 80° C. to leave behind a wine-red product. Yield=99.9%. Spectroscopic data: $^1$H NMR (300 MHz, $CDCl_3$): δ 5-68 (s, $C_5H_5$, PR), 5.32(s, $C_5H_5$, CR), 3.5-1.5 (br, —$CB_{10}H_{10}C$—), 0.30, 0.26, 0.20, 0.11 and 0.09 (s, —$Si(CH_3)_2$—). $^{13}$C NMR (75 MHz, $CDCl_3$): δ 241.5 (CO) (CR), 234.1(CO) (CR), 229.8 (CO) (CR), 226.5 (CO) (PR), 223.9 (CO)(PR); 132.46 (C4), 130.86 (C8), 128.79 (C5), 111.22 (C3), 95.72 ($C_5H_5$, PR), 92.29 (C6 and C7), 91.99 ($C_5H_5$, CR), 87.04 (C2), 84.85 (C1), 68.46, 68.14, 68.06 and 68.00 ($CB_{10}H_{10}C$), 1.80, 1.00, 0.47 and 0.28 (—$Si(CH_3)_2$—). IR (NaCl): 3113.76 $_{(vC—H)}$ ($C_5H_5$), 2962.07 $_{(vC—H)}$, 2598.78 $_{(vB—H)}$, 2070.44$_{(vC—C)}$ (diacetylene), 1951.67 $_{(vC—O)}$, 1922.76 $_{(vC—O)}$, 1901.02 $_{(vC—O)}$, 1888.34 $_{(vC—O)}$, 1421.12 $_{(vC—C)}$, 1257.45 $_{(vSi—C)}$, 1081.80 $_{(vSi—O—Si)}$, 822.31 $_{(vSi—C)}$, 798.36 $_{(vSi—C)}$, 586.78, 554.84, 502.94.

EXAMPLE 18

Reaction of $Cp_2Mo_2(CO)_6$ with 1 at a ratio of Mo:1=1:5—A Schlenk flask, flame-dried under vacuum, was charged with 0.25 g (0.5495 mmol) of 1 and 5 mL of THF, which was syringed into it under argon. In another flame-dried Schlenk flask $Cp_2Mo_2(CO)_6$ (0.0538 g; 0.1099 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of $Cp_2Mo_2(CO)_6$ (absorptions for $Cp_2Mo_2(CO)_6$ are 1960 and 1915 $cm^{-1}$) was achieved. (In this case the completion of the reaction was indicated by four new carbonyl absorptions at,1950, 1923, 1900, and 1891 $cm^{-1}$ and a remnant diacetylene absorption at 2070 $cm^{-1}$ in the product's IR. The intensity of the diacetylene absorption was 2-3 times more than that in the Mo:1=1:1 reaction). The solvents were then removed under vacuum at 80° C. to leave behind a wine-red product. Yield=99.9%.

EXAMPLE 19

Reaction of $Cp_2Mo_2(CO)_6$ with 1 at a ratio of Mo:1=3:1—A Schlenk flask, flame-dried under vacuum, was charged with 0.25 g (0.5495 mmol) of 1 and 5 mL of THF, which was syringed into it under argon. In another flame-dried Schlenk flask $Cp_2Mo_2(CO)_6$ (0.807 g; 1.649 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of $Cp_2Mo_2(CO)_6$ (absorptions for $Cp_2Mo_2(CO)_6$ are 1960 and 1915 $cm^{-1}$) was achieved. (In this case the completion of the reaction was indicated by four new carbonyl absorptions of the product and remnant of $Cp_2Mo_2(CO)_6$ absorptions in the product's IR). The solvents were then removed under vacuum at 80° C. to leave behind a wine-red product. Yield=99.9%.

EXAMPLE 20

Reaction of $Ru_3(CO)_{12}$ with 1 at a ratio of Ru:1=1:1—Reagents 1(0.5 g, 1.099 mmol) and $Ru_3(CO)_{12}$ (0.704 g, 1.099 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. It was allowed to proceed until the disappearance of the carbonyl absorptions of $Ru_3(CO)_{12}$ (absorptions for $Ru_3(CO)_{12}$ are 2052, 2017, 1994, and 1982 $cm^{-1}$) was achieved. (In this case, the completion of the reaction was indicated by four new carbonyl absorptions at 2081, 2061, 2023, and 1961 $cm^{-1}$ and a remnant diacetylene absorption at 2070 $cm^{-1}$ in the product's IR). The product (yield=99.5%) was collected by removing hexane under vacuum with the flask placed in an oil bath at 80° C. Yield=99.9%.

EXAMPLE 21

Reaction of $Ru_3(CO)_{12}$ with 1 at a ratio of Ru:1=1:5—Reagents 1 (0.5 g, 1.099 mmol) and $Ru_3(CO)_{12}$ (0.422 g, 0.219 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. (In this case, the completion of the reaction was indicated by four new carbonyl absorptions at 2081, 2061, 2023, and 1961 $cm^{-1}$ and a remnant diacetylene absorption at 2070 $cm^{-1}$ in the product's IR. The intensity of the diacetylene absorption was 2-3 times more than that in the Ru:1=1:1 reaction). The product (yield=99.5%) was collected by removing hexane under vacuum with the flask placed in an oil bath at 80° C. Yield=99.9%.

EXAMPLE 22

Reaction of $Ru_3(CO)_{12}$ with 1 at a ratio of Ru:1=3:1—Reagents 1(0.5 g, 1.099 mmol) and $Ru_3(CO)_{12}$ (2.112 g, 3.297 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. (In this case, the completion of the reaction was indicated by four new carbonyl absorptions at 2081, 2061, 2023, and 1961 cm$^{-1}$ and remnant of Ru$_3$(CO)$_{12}$ absorptions in the product's IR). The product (yield=99.5%) was collected by removing hexane under vacuum with the flask placed in an oil bath at 80° C. Yield=99.9%.

EXAMPLE 23

Reaction of Co$_2$(CO)$_8$ and Fe(CO)$_5$ with 1 at a ratio of (Co+Fe):1=1:1—Reagen 1 (0.5 g, 1.099 mmol) and a mixture of Co$_2$(CO)$_8$ (0.183 g, 0.5495 mmol) and Fe(CO)$_5$ (0.108 g, 0.5495 mmol) were taken in separate flame dried Schlenk flasks under argon. The reagents were dissolved in the nonpolar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. It was allowed to proceed until the disappearance of the carbonyl absorptions of Co$_2$(CO)$_8$ and Fe(CO)$_5$ (absorptions for Co$_2$(CO)$_8$ are 2022, 1847, and 1828 cm$^{-1}$; for Fe(CO)$_5$ are 2013 and 2005 cm$^{-1}$) was achieved. (In this case, the completion of the reaction was indicated by new carbonyl absorptions at 2097, 2062, 2030, 1815, 1735, and 1695 cm$^{-1}$ and a remnant diacetylene absorption at 2070 cm$^{-1}$ in the product's IR). The product (yield=99.5%) was collected by removing hexane under vacuum with the flask placed in an oil bath at 80° C. Yield=99.9%.

EXAMPLE 24

Reaction of Co$_2$(CO)$_8$ and Fe(CO)$_5$ with 1 at a ratio of (Co+Fe):1=1:5—Reagents 1 (0.5 g, 1.099 mmol) and a mixture of Co$_2$(CO)$_8$ (0.037 g, 0.1099 mmol) and Fe(CO)$_5$ (0.022 g, 0.1099 mmol) were taken in separate flame dried Schlenk flasks under argon. The reagents were dissolved in the nonpolar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. (In this case, the completion of the reaction was indicated by new carbonyl absorptions at 2097, 2062, 2030, 1815, 1735, and 1695 cm$^{-1}$ and a remnant diacetylene absorption at 2070 cm$^{-1}$ in the product's IR. The intensity of the diacetylene absorption was 2-3 times more than that in the Co+Fe:1=1:1 reaction)). The product (yield=99.5%) was collected by removing hexane under vacuum with the flask placed in an oil bath at 80° C. Yield=99.9%.

EXAMPLE 25

Reaction of Co$_2$(CO)$_8$ and Fe(CO)$_5$ with 1 at a ratio of (Co+Fe):1=3:1—Reagents 1 (0.5 g, 1.099 mmol) and a mixture of Co$_2$(CO)$_8$ (0.549 g, 1.649 mmol) and Fe(CO)$_5$ (0.324 g, 1.649 mmol) were taken in separate flame dried Schlenk flasks under argon. The reagents were dissolved in the nonpolar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. (In this case, the completion of the reaction was indicated by new carbonyl absorptions at 2097, 2062, 2030, 1815, 1735, and 1695 cm$^{-1}$ and the remnant of Co$_2$(CO)$_8$ and Fe(CO)$_5$ absorptions in the product's IR). The product (yield=99.5%) was collected by removing hexane under vacuum with the flask placed in an oil bath at 80° C. Yield=99.9%.

EXAMPLE 26

Reaction of (hfac)Cu(COD) with 1 at a ratio of Cu:1=1:1—Reagents 1 (0.5 g, 1.099 mmol) and (hfac)Cu(COD) (0.416 g, 1.099 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The remnant diacetylene absorption at 2070 cm$^{-1}$ was observed in the product's IR. The product (yield=99.5%) was collected by removing hexane under vacuum with the flask placed in an oil bath at 80° C. Yield=99.9%.

EXAMPLE 27

Reaction of (hfac)Cu(COD) with 1 at a ratio of Cu:1=1:5—Reagents 1 (0.5 g, 1.099 mmol) and (hfac)Cu(COD) (0.083 g, 0.219 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The remnant diacetylene absorption at 2070 cm$^{-1}$ (about 2-3 times more intense than in Example 26) was observed in the product's IR. The product (yield=99.5%) was collected by removing hexane under vacuum with the flask placed in an oil bath at 80° C. Yield=99.9%.

EXAMPLE 28

Reaction of (hfac)Cu(COD) with 1 at a ratio of Cu:1=3:1—Reagents 1(0.5 g, 1.099 mmol) and (hfac)Cu(COD) (1.248 g, 3.297 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The product (yield=99.5%) was collected by removing hexane under vacuum with the flask placed in an oil bath at 80° C. Yield=99.9%.

EXAMPLE 29

Physical mixing of MgCl$_2$ with 1 at a ratio of Mg:1=1:1:—Reagents 1 (0.5 g, 1.099 mmol) and MgCl$_2$ (0.105 g, 1.099 mmol) were physically ground together in a ceramic mortar using a pestle. A pasty mixture was obtained. Yield=100%.

EXAMPLE 30

Physical mixing of SmCl$_2$ with 1 at a ratio of Sm:1=1:1—Reagents 1(0.5 g, 1.099 mmol) and SmCl$_2$ (0.243 g, 1.099 mmol) were physically ground together in a ceramic mortar using a pestle. A pasty mixture was obtained. Yield=100%.

EXAMPLE 31

Physical mixing of SmCl$_2$ and Co$_2$(CO)$_8$ with 1 at a ratio of (Sm+Co):1=1:1—Reagents 1 (0.5 g, 1.099 mmol), SmCl$_2$ (0.122 g, 0.550 mmol) and Co$_2$(CO)$_8$ (0.188 g, 0.550 mmol) were physically ground together in a ceramic mortar using a pestle. A pasty mixture was obtained. Yield=100%.

EXAMPLE 32

Physical mixing of AlCl$_2$ with 1 at a ratio of Al:1=1:1—
Reagents 1 (0.5 g, 1.099 mmol) and AlCl$_2$ (0.147 g, 1.099 mmol) were physically ground together in a ceramic mortar using a pestle. A pasty mixture was obtained. Yield=100%.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A metallized linear polymer comprising a backbone comprising:
   an acetylenic repeat unit, at least one of the acetylenic repeat units comprising a (ML$_x$)$_y$-acetylene complex;

wherein each M is an independently selected metal;
   wherein each L is an independently selected ligand; and
   wherein x and y are positive integers; and
   one or more repeat units selected from —SiR$_2$—(O—SiR$_2$)$_n$— and —SiR$_2$—(O—SiR2)$_n$-[Cb—SiR$_2$—(O—SiR$_2$)$_n$]$_m$—;
   wherein each R is an independently selected organic group;
   wherein each Cb is an independently selected carborane;
   wherein each n is an independently selected integer greater than or equal to one; and
   wherein each m is an independently selected integer greater than or equal to zero.

2. The metallized polymer of claim 1, wherein each acetylenic repeat unit consists of two groups independently selected from acetylene and (ML$_x$)$_y$-acetylene complex.

3. The metallized polymer of claim 1, wherein each M is independently selected from main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

4. The metallized polymer of claim 1, wherein each L is independently selected from carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

5. The metallized polymer of claim 1, wherein each Cb is —CB$_{10}$H$_{10}$C—.

6. The metallized polymer of claim 1, wherein each R is methyl.

7. The metallized polymer of claim 1, wherein the backbone further comprises:
   one or more metallic repeat units selected from metallocenylene, -M'Cp$_2$-, and -M'L'$_z$-;
   wherein each M' is a metal;
   wherein Cp is cyclopentadienyl;
   wherein each L' is an independently selected ligand; and
   wherein each z is an integer from 2 to 6.

8. The metallized polymer of claim 7, wherein each metallocenylene is fenocenylene.

9. The metallized polymer of claim 7, wherein each M' is independently selected from main group metals, transition metals, lanthanides, actinides, iron, ruthenium, osmium, molybdenum, zirconium, vanadium, tungsten, titanium, platinum, nickel, rhodium, and palladium.

10. The metallized polymer of claim 7, wherein each L' is independently selected from amino, ethylene, and cyclooctadiene.

11. The metallized polymer of claim 1, wherein the backbone comprises the formula:

wherein Q is the acetylenic repeat unit;
   wherein Y is a metallic repeat unit selected from metallocenylene, -M'Cp$_2$-, and -M'L'$_z$-;
   wherein each M' is a metal;
   wherein Cp is cyclopentadienyl;
   wherein each L' is an independently selected ligand; and
   wherein each z is an integer from 2 to 6;
   wherein each p is an integer greater than or equal to zero.

12. The metallized polymer of claim 11, wherein n, m, and p are, as a group, selected from:
   n is 1, m is 1, and p is zero;
   n is 1, m is zero, and p is zero;
   n is 1, m is 1, and p is 1; and
   n is 1, m is zero, and p is 1.

13. A composition comprising:
   the metallized polymer of claim 1; and
   a siloxane polymer comprising a backbone comprising:
      one or more acetylene groups; and
      one or more repeat units selected from —SiR$_2$—(O—SiR$_2$)$_n$— and —SiR$_2$—(O—SiR$_2$)$_n$-[Cb-SiR$_2$—(O—SiR$_2$)$_n$]$_m$—.

14. The metallized polymer of claim 1, wherein the backbone comprises the formula:

wherein Q is the acetylenic repeat unit.

15. The metallized polymer of claim 1, wherein the backbone consists of the formula:

wherein Q is the acetylenic repeat unit.

16. A composition comprising:
a linear siloxane polymer comprising a backbone comprising:
one or more acetylene groups; and
one or more repeat units selected from —SiR$_2$—(O—SiR2)$_n$— and —SiR$_2$—(O—SiR2)$_n$-[Cb-SiR$_2$—(O—SiR2)$_n$]$_m$—;
wherein each R is independently selected from organic group and methyl;
wherein each Cb is independently selected from carborane and —CB$_{10}$H$_{10}$C—;
wherein each n is an independently selected integer greater than or equal to one; and
wherein each m is an independently selected integer greater than or equal to zero; and
a metallic compound capable of reacting with the acetylene group to form a (ML$_x$)$_y$-acetylene complex;
wherein each M is an independently selected metal;
wherein each L is an independently selected ligand; and
wherein x and y are positive integers.

17. The composition of claim 16, wherein the metallic compound is one or more of V(CO)$_6$, Cr(CO)$_6$, Mo(CO)$_6$, W(CO)$_6$, Mn$_2$(CO)$_{10}$, Tc$_2$(CO)$_{10}$, Re$_2$(CO)$_{10}$, Fe(CO)$_5$, Fe$_2$(CO)$_9$, Fe$_3$(CO)$_{12}$, Ru(CO)$_5$, Ru$_3$(CO)$_{12}$, Os(CO)$_5$, Os$_3$(CO)$_{12}$, Co$_2$(CO)$_8$, Co$_3$(CO)$_{12}$, Co$_6$(CO)$_{16}$, Rh$_4$(CO)$_{12}$, Rh$_6$(CO)$_{16}$, Ir$_4$(CO)$_{12}$, Ir$_6$(CO)$_{16}$, Ni(CO)$_4$, Cp(CH$_3$)$_5$Re(CO)$_3$, Cp(CH$_3$)$_5$Re(CO)$_3$, [Cp(CH$_3$)$_5$]$_2$Cr$_2$(CO)$_4$, Cp$_2$Fe$_2$(CO)$_4$, C$_6$H$_8$Fe(CO)$_3$, C$_6$H$_8$Fe(CO)$_3$, C$_8$H$_8$Fe(CO)$_3$, CpCr(CO)$_3$, Cp$_2$Mo$_2$(CO)$_6$, C$_7$H$_8$Mo(CO)$_3$, CpMn(CO)$_3$, Cp(Si(CH$_3$)$_3$)Mn(CO)$_3$, Cp(CH$_3$)$_5$Rh(CO)$_2$, Cp$_2$Ru$_2$(CO)$_4$, (hexafluroacetylacetonate)Cu(cyclooctadiene), Cr(hexafluroacetylacetonate), Co(acetylacetonate) (CH$_3$CN)$_4$Cu(hexafluroacetylacetonate), (CH$_3$)$_2$Au(acetylacetonate), (cyclooctadiene)Ir(acetylacetonate), Fe(acetylacetonate), Mn(acetylacetonate), MoO$_2$(acetylacetonate)$_2$, Ni(hexafluroacetylacetonate), Ni(cyclooctadiene)$_2$, Ni(SCN)$_2$, PdCl$_2$(CH$_3$CN)$_2$, Pd(NH$_3$)$_2$(NO$_2$)$_2$, Pt(NH$_3$)$_2$Cl$_2$, Rh(cyclooctadiene)$_2$(SO$_3$CF$_3$), Rh(cyclooctadiene)Cl$_2$, Zr(trifluoroacetylacetonate), MgCl$_2$, SmCl$_2$, and AlCl$_2$.

18. The composition of claim 16, wherein the backbone further comprises:
one or more metallic repeat units selected from metallocenylene, ferrocenylene, -M'Cp$_2$-, and -M'L'$_z$-;
wherein each M' is a metal;
wherein Cp is cyclopentadienyl;
wherein each L' is an independently selected ligand; and
wherein each z is an integer from 2 to 6.

19. The composition of claim 18, wherein each M' is independently selected from main group metals, transition metals, lanthanides, actinides, iron, ruthenium, osmium, molybdenum, zirconium, vanadium, tungsten, titanium, platinum, nickel, rhodium, and palladium.

20. The composition of claim 18, wherein each L' is independently selected from amino, ethylene, and cyclooctadiene.

21. The composition of claim 16, wherein the backbone comprises the formula:

wherein Y is a metallic repeat unit selected from metallocenylene, -M'Cp$_2$-, and -M'L'$_z$-;
wherein each M' is a metal;
wherein Cp is cyclopentadienyl;
wherein each L' is an independently selected ligand;
wherein each q is a positive integer; and
wherein each z is an integer from 2 to 6;
wherein each p is an integer greater than or equal to zero.

22. The composition of claim 16, wherein n, m, p, and q are, as a group, selected from:
n is 1, m is 1, p is zero, and q is 2;
n is 1, m is zero, p is zero, and q is 2;
n is 1, m is 1, p is 1, and q is 2; and
n is 1, m is zero, p is 1, and q is 2.

23. A method of making a metallized composition comprising:
providing the composition of claim 16; and
heating the composition to form at least one (ML$_x$)$_y$-acetylene complex.

24. The composition of claim 16, wherein the backbone comprises the formula:

wherein Q is the acetylenic repeat unit.

25. The composition of claim 16, wherein the backbone consists of the formula:

wherein Q is the acetylenic repeat unit.

* * * * *